United States Patent
Sayer et al.

(10) Patent No.: US 9,802,161 B2
(45) Date of Patent: Oct. 31, 2017

(54) FLUID TREATMENT ASSEMBLIES

(75) Inventors: Cheryl Sayer, Lowell, MA (US); Sylvia Messier, Stow, MA (US); James Covino, Haverhill, MA (US)

(73) Assignee: PALL CORPORATION, Pot Washington, NY (US)

(*) Notice: Subject to any disclaimer, the term of this patent is extended or adjusted under 35 U.S.C. 154(b) by 314 days.

(21) Appl. No.: 13/293,586

(22) Filed: Nov. 10, 2011

(65) Prior Publication Data

US 2013/0118971 A1    May 16, 2013

(51) Int. Cl.
| | | |
|---|---|---|
| *B01D 63/00* | (2006.01) | |
| *B01D 63/08* | (2006.01) | |
| *B01D 65/00* | (2006.01) | |

(52) U.S. Cl.
CPC .......... *B01D 65/00* (2013.01); *B01D 63/082* (2013.01); *B01D 2313/02* (2013.01); *B01D 2313/025* (2013.01); *B01D 2313/06* (2013.01)

(58) Field of Classification Search
CPC .... B01D 63/08; B01D 63/081; B01D 63/082; B01D 63/084; B01D 63/085; B01D 63/087; B01D 63/088; B01D 2313/02; B01D 2313/025; B01D 2313/06; B01D 2313/13; B01D 2313/20; B01D 2313/21; B01D 61/50
USPC .... 210/224, 226, 227, 228, 230, 231, 321.6, 210/321.72, 321.73, 321.75, 321.84
See application file for complete search history.

(56) References Cited

U.S. PATENT DOCUMENTS

| | | | |
|---|---|---|---|
| 3,541,595 A | | 11/1970 | Edwards |
| 3,585,131 A | * | 6/1971 | Esmond .................. 210/321.77 |
| 3,695,445 A | | 10/1972 | Esmond |
| 3,837,146 A | | 9/1974 | Faure et al. |
| 3,869,375 A | | 3/1975 | Ono et al. |
| 4,898,675 A | * | 2/1990 | Lavender ..................... 210/651 |
| 5,342,517 A | | 8/1994 | Kopf |
| 5,868,930 A | | 2/1999 | Kopf |
| 2005/0048347 A1 | | 3/2005 | Takashita et al. |
| 2007/0056894 A1 | * | 3/2007 | Connors, Jr. ............ 210/321.75 |
| 2008/0135468 A1 | | 6/2008 | Gagnon et al. |
| 2008/0135499 A1 | | 6/2008 | Gagnon et al. |
| 2008/0135500 A1 | | 6/2008 | Gagnon et al. |

(Continued)

FOREIGN PATENT DOCUMENTS

| | | |
|---|---|---|
| CN | 1895755 A | 1/2007 |
| CN | 101379001 A | 3/2009 |

(Continued)

OTHER PUBLICATIONS

Physical and chemical properties of Polycarbonate; Claremont Polymer Shapes Inc. No Date. 2 pages.*

(Continued)

*Primary Examiner* — Pranav Patel
(74) *Attorney, Agent, or Firm* — Leydig Voit & Mayer

(57) ABSTRACT

Fluid treatment assemblies may include first and second end pieces, at least one fluid treatment unit positioned between the first and second end pieces, and a retainer extending between the first and second end pieces and arranged to press the fluid treatment unit(s) and the first and second end pieces together. Each of the end pieces is formed from a nonmetallic material and has a flexural modulus of at least about $1.5 \times 10^6$ psi.

20 Claims, 2 Drawing Sheets

(56) References Cited

U.S. PATENT DOCUMENTS

2011/0174711 A1* 7/2011 Morrissey et al. ........... 210/230

FOREIGN PATENT DOCUMENTS

EP          2 266 682 A2    12/2010
WO    WO 2011/112560 A2    9/2011

OTHER PUBLICATIONS

Properties of PEEK material, pp. 1-2, http://www.makeitfrom.com/material-data/?for=Polyetheretherketone-PEEK. (No date available).*

* cited by examiner

FLUID TREATMENT ASSEMBLIES

DISCLOSURE OF THE INVENTION

The invention relates to fluid treatment assemblies that may be used to treat a wide variety of fluids in any of numerous ways in single- or multi-use applications.

Fluid treatment assemblies embodying the invention may include one or more fluid treatment units pressed between opposite end pieces. Each fluid treatment unit may include a permeable fluid treatment medium having a feed side and an opposite permeate side. Fluid to be treated may be known as process or feed fluid, and the fluid treatment assembly may include a feed inlet and a feed passage that extends from the feed inlet to the feed side of the permeable medium. Fluid that passes from the feed side through the permeable fluid treatment medium to the permeate side may be known as filtrate or permeate, and the fluid treatment assembly may further include a permeate outlet and a permeate passage that extends from the permeate side of the permeable medium to the permeate outlet.

Fluid treatment assemblies embodying the invention may be arranged to treat the fluid in a direct or dead-end flow mode of operation or in a tangential or cross flow mode of operation. In fluid treatment assemblies arranged for a direct flow mode of operation, the feed passage may terminate at the feed side of the permeable medium. Feed fluid may be supplied under pressure to the feed inlet, where the fluid pressure forces the feed fluid through the feed passage to the feed side of the permeable medium. The fluid pressure then forces all of the feed fluid as permeate through the permeable medium to the permeate side and then through the permeate passage to the permeate outlet.

Fluid treatment assemblies arranged for a tangential flow mode of operation may further include a retentate outlet and a retentate passage that extends from the feed side of the permeable medium to the retentate outlet. Again, feed fluid may be supplied under pressure to the feed inlet, forcing feed fluid through the feed passage and tangentially along the feed side of the permeable medium. The fluid pressure forces only a portion of the feed fluid as permeate through the permeable medium to the permeate side and then through the permeate passage to the permeate outlet. The remainder of the feed fluid, which does not pass through the permeable medium and may be known as concentrate or retentate, is forced from the feed side of the permeable medium through the retentate passage to the retentate outlet.

Whether arranged for a direct flow or a tangential flow mode of operation, fluid treatment assemblies embodying the invention may additionally include one or more manifolds and a retainer. Each manifold may include one or more of the feed inlet, the permeate outlet, and the retentate outlet, and the manifold(s) may be positioned between the end pieces with fluid passages in the manifold(s) fluidly communicating with the appropriate fluid passages in the fluid treatment unit(s). The retainer may extend between the first and second end pieces to press the end pieces, the fluid treatment unit(s), and the manifold(s) against one another and hold the fluid treatment assembly together against all of the forces associated with the fluid pressures within the fluid treatment assembly.

SUMMARY OF THE INVENTION

In accordance with one aspect of the invention, fluid treatment assemblies may comprise at least one fluid treatment unit, a feed inlet and a feed passage, a permeate outlet and a permeate passage, first and second end pieces, and a retainer. The fluid treatment unit may be positioned between the first and second end pieces and may include a permeable fluid treatment medium having a feed side and a permeate side. The feed passage may extend from the feed inlet through the fluid treatment unit to the feed side of the permeable medium. The permeate passage may extend from the permeate side of the permeable medium through the fluid treatment unit to the permeate outlet. At least one end piece may be formed from a nonmetallic material and may have a flexural modulus of at least about $1.5 \times 10^6$. The retainer may extend between the first and second end pieces and may be arranged to press the fluid treatment unit and the first and second end pieces against one another. The retainer extends between the first and second end pieces past said at least one fluid treatment unit, and the distance between the outer periphery of the retainer and the outer periphery of said at least one fluid treatment unit is less than or equal to about 0.25 inch (six millimeters).

In accordance with another aspect of the invention, fluid treatment assemblies may comprise first and second end pieces, one or more manifolds, and one or more fluid treatment units, Each end piece may be formed from a nonmetallic material and may have a flexural modulus of at least about $1.5 \times 10^6$. The one or more manifolds may be positioned between the end pieces. Each manifold may have at least one of a feed inlet, a permeate outlet, and a retentate outlet. The one or more fluid treatment units may also be positioned between the end pieces, and each fluid treatment unit may have a permeable fluid treatment medium which includes a feed side and an opposite permeate side. The fluid treatment assemblies may also comprise a feed passage, a permeate passage, a retentate passage, and a retainer. The feed passage may extend from the feed inlet through at least one manifold and at least one fluid treatment unit to the feed side of a permeable medium. The permeate passage may extend from the permeate side of a permeable medium through at least one fluid treatment unit and at least one manifold to the permeate outlet, The retentate passage may extend from the feed side of a permeable medium through at least one fluid treatment unit and at least one manifold to the retentate outlet. The retainer may extend between the first and second end pieces and may be arranged to press the one or more manifolds, the one or more fluid treatment units, and the end pieces against one another, The retainer extends between the first and second end pieces past the one or more fluid treatment units, and the distance between the outer periphery of the retainer and the outer periphery of the one or more fluid treatment units is less than or equal to about 0.25 inch (six millimeters).

Embodiments of the invention have many advantages. For example, by providing one or more end pieces formed from a nonmetallic material and having a flexural modulus of at least about $1.5 \times 10^6$ psi, fluid treatment assemblies embodying the invention can easily withstand all of the forces generated by the pressurized fluids within the assembly without any additional external support. The nonmetallic end pieces coupled to one another by the retainer tightly press and seal the fluid treatment units, manifolds, and any other components between the end pieces without any external holders, such as mechanical or hydraulic presses. Consequently, fluid treatment assemblies embodying the invention may be self-contained; they may be preassembled, sealed, and sanitized by the manufacturer and then quickly and easily incorporated in the customer's fluid system by simply connecting the feed inlet, the permeate outlet, and any retentate outlet of the fluid treatment assembly to corresponding fittings of the fluid system.

DETAILED DESCRIPTION OF EMBODIMENTS OF THE INVENTION

Figure 1:
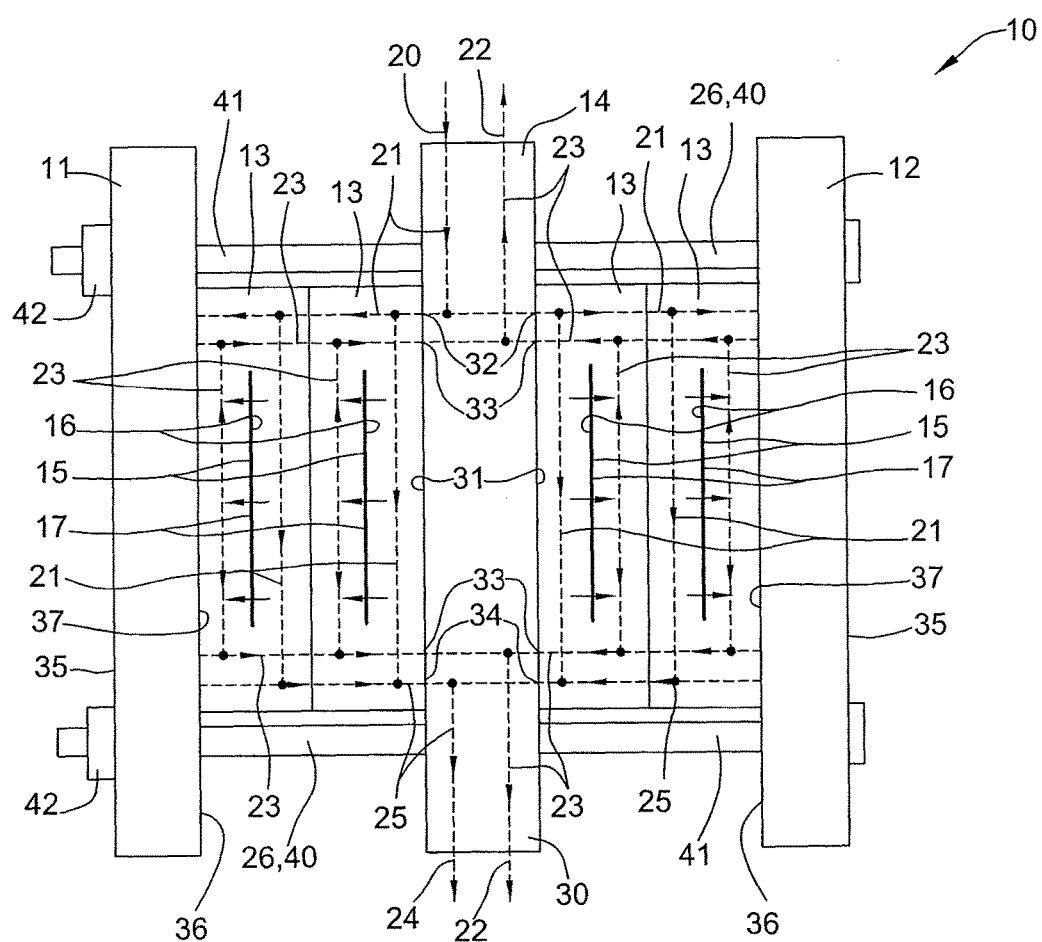
FIG. 1 is a representative view of a fluid treatment assembly.
Figure 2:
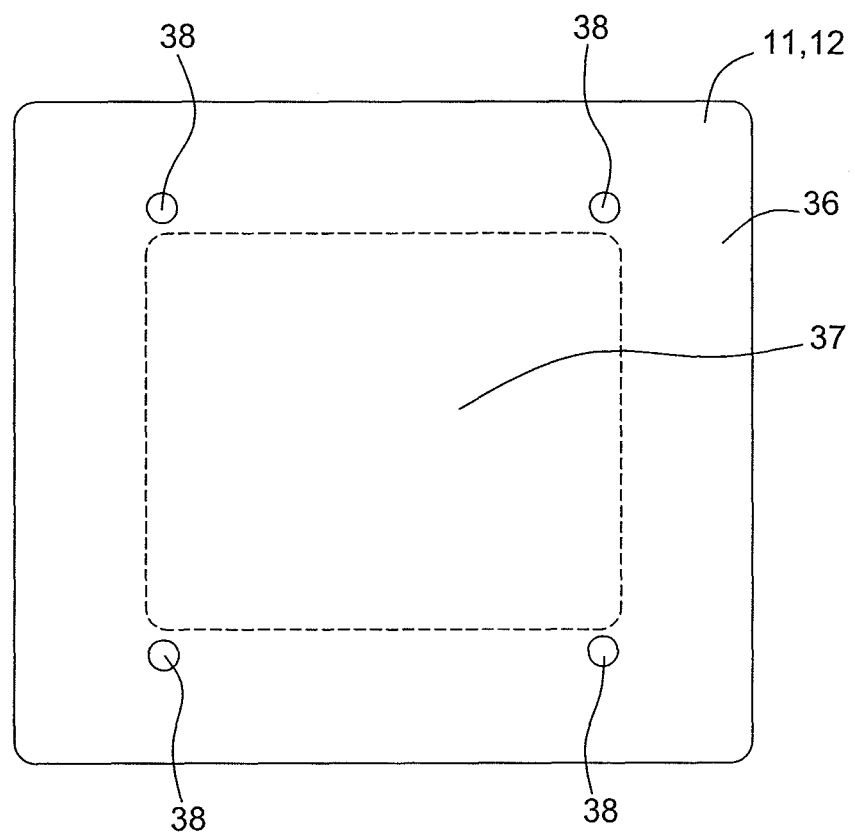
FIG. 2 is a plan view of an end piece of the fluid treatment assembly of FIG. 1.

Fluid treatment assemblies embodying one or more aspects of the invention may be configured in a wide variety of ways. One of many different examples of a fluid treatment assembly 10 embodying the invention is shown in FIG. 1, Generally, the fluid treatment assembly 10 may comprise a multilayer structure including opposite end pieces 11, 12 and one or more fluid treatment units 13 and one or more manifolds 14 positioned between the end pieces 11, 12. Each fluid treatment unit 13 may include a permeable fluid treatment medium 15 having a feed side 16 and an opposite permeate side 17. The fluid treatment assembly 10 may also include at least one feed inlet 20 and a feed passage 21 for directing feed fluid from the feed inlet 20 to the feed side 16 of the permeable medium 15 of at least one fluid treatment unit 13, e,g., all of the fluid treatment units, and at least one permeate outlet 22 and a permeate passage 23 for directing permeate from the permeate side 17 of the permeable medium 15 of at least one fluid treatment unit 13, e.g., all of the fluid treatment units 13, to the permeate outlet 22. The fluid treatment assembly 10 shown in FIG. 1 may be arranged for a cross flow mode of operation and may further include a retentate outlet 24 and a retentate passage 25 for directing retentate from the feed side 16 of the permeable medium 15 to the retentate outlet 24 of at least one fluid treatment unit 13, e.g., all of the fluid treatment units 13. Further, the fluid treatment assembly 10 may include a retainer 26 which extends between the end pieces 11, 12 to press the end pieces 11, 12, the fluid treatment unit(s) 13, and the manifold(s) 14 against one another and hold the fluid treatment assembly 10 together.

Each fluid treatment unit 13 may be configured in any of numerous ways and the shape and size of each fluid treatment unit 13 may vary from one fluid treatment assembly to another. For example, each fluid treatment unit may comprise one or more layers of permeable fluid treatment media sealed within a casing to define the feed side and the permeate side of the permeable medium. One or more feed channels, permeate channels, and/or retentate channels may extend within the casing to supply feed fluid to the feed side of the permeable medium, to receive permeate from the permeate side of the permeable medium, and to receive retentate from the feed side of the permeable medium. The feed channels may form a portion of the feed passage 21, the permeate channels may form a portion of the permeate passage 23, and the retentate channels may form a portion of the retentate passage 25.

Alternatively, the fluid treatment unit may comprise at least one feed layer, at least one permeate layer, and at least one layer of a permeable fluid treatment medium. The feed layer and the permeate layer may each comprise a porous sheet, e.g., a woven or nonwoven fibrous sheet or a sheet of metallic or polymeric mesh, and the permeable medium layer may be positioned between the feed and permeate layers. The arrangement of the feed layer(s), the medium layer(s), and the permeate layer(s) may be encased, e.g., encapsulated by a thermoplastic or thermosetting polymer, and provided with feed, permeate, and retentate openings, e.g., throughholes. The feed opening may fluidly communicate with the porous feed layer, forming a portion of the feed passage 21; the retentate opening may also fluidly communicate with the porous feed layer, forming a portion of the retentate passage 25; and the permeate opening may fluidly communicate with the porous permeate layer, forming a portion of the permeate passage 23. Examples of fluid treatment units are disclosed, for example, in U.S. Provisional Patent Application No. 61/476,874 filed on Apr. 19, 2011 and entitled Fluid Treatment Arrangements and Methods of Making Fluid Treatment Arrangements.

The fluid treatment medium may be permeable, i.e., porous, permeable, semipermeable, or permselective, and may be formed from any of numerous materials, including, for example, a natural or synthetic polymer. The fluid treatment medium may be fashioned as any of a wide variety of structures, including, for example, a fibrous or filamentous structure, such as a woven or non-woven sheet, or a membrane, such as a supported or unsupported membrane. Further, the fluid treatment medium may have, or may be modified to have, any of a myriad of fluid treatment characteristics. For example, the fluid treatment medium may have a positive, negative, or neutral electrical charge; it may be liquiphobic or liquiphilic, including hydrophobic or hydrophilic or oleophobic or oleophilic; and/or it may have attached functional groups, such as ligands or any other reactive moiety, that can chemically bind to substances in the fluid. The fluid treatment medium may be formed from, impregnated with, or otherwise contain a variety of materials that function to further treat the fluid in any of numerous ways. These functional materials may include, for example, sorbents, ion exchange resins, chromatography media, enzymes, reactants, or catalysts of all types that may chemically and/or physically bind, react with, catalyze, deliver, or otherwise affect substances in the fluid or the fluid itself. Further, the fluid treatment medium may have any of a wide range of molecular weight cutoffs or removal ratings, for example, from ultraporous or nanoporous or finer to microporous or coarser. The fluid treatment medium may thus function as a treatment medium of any type, including a capture medium or a separation medium such as a filtration medium.

The manifolds may also be variously configured. For example, the manifold may include at least one fluid passage and a fluid inlet for receiving fluid from a fluid system (not shown) or a fluid outlet for discharging fluid to the fluid system coupled to the fluid passage. The feed inlet, the permeate outlet, and the retentate outlet may each be located on separate manifolds, or a single manifold may include any two or more of the feed inlet, the permeate outlet, and the retentate outlet. In the embodiment shown in FIG. 1, a single manifold 14 may include all three of the feed inlet 20, the permeate outlet 22, and the retentate outlet 24. The manifold 14 may include a body 30 having a mounting surface 31 facing the fluid treatment units 13 on one side or on both opposite sides of the manifold 14. Feed, permeate, and/or retentate openings 32, 33, 34 in the body 30 of the manifold 14, e.g., in the mounting surface 31, allow one or more of the feed, permeate, and/or retentate passages 21, 23, 25 to extend from the fluid treatment units 13 through the manifold 14 to a feed inlet 20, a permeate outlet 22, and/or retentate outlet 24 on the body 30 of the manifold 30. Each inlet and/or outlet may be configured as a fitting for connecting the inlet and/or outlet to the fluid system and may include a mechanism for opening and closing the inlet/outlet. The fluid system may supply feed fluid to the fluid treatment assembly 10 and/or receive permeate or retentate from the fluid treatment assembly 10. The feed passage 21 may extend from the feed inlet 20 through the body 30 of the manifold 14 to the fluid treatment units 13 and/or the permeate passage 23 may extend from the fluid treatment units 13 through the body 30 of the manifold 14 to the permeate outlet 22. The retentate passage 25 may extend from the fluid treatment units 13 through the body 30 of the manifold 14 to the retentate outlet 24. In the illustrated embodiment, the feed inlet, the permeate outlet, and the retentate outlet may all be on one manifold. In other embodiments, the feed inlet, permeate outlet, or the retentate outlet may be associated with another manifold of the fluid treatment assembly. Examples of manifolds are disclosed, for example, in United States Patent Application Publication No. US 2008/0132200 A1 entitled Filtration Assemblies, Filtration Manifolds, Filtration Units, and Methods for Channeling Permeate and in U.S. patent application Ser. No. 12/954,118 filed on Nov. 24, 2010 and entitled Manifold Plates and Fluid Treatment Arrangements Including Manifold Plates.

The fluid treatment unit(s) 13 and the manifold(s) 14 may be mounted between the end pieces 11, 12 in any of numerous ways. For example, a manifold 14 may be positioned between the end pieces 11, 12 with a first set of one or more fluid treatment units 13 between one end piece 11 and the one side of the manifold 14 and with a second set of one or more fluid treatment units 13 between the other end piece 12 and the opposite side of the manifold 30. Alternatively, a manifold may be positioned between the end pieces adjacent to one of the end pieces with a set of one or more fluid treatment units between the manifold and the other end piece. As another alternative, a manifold may be positioned adjacent to each end piece and a set of one or more fluid treatment units may be arranged between the manifolds. The fluid treatment units 13 of each set may be arranged to fluidly communicate with one another and the manifold 14 via the feed, permeate and retentate passages 21, 23, 25 in a variety of ways, for example, in a serial, parallel, or combined serial/parallel manner. The fluid treatment units 13 may be bonded to one another, the manifold 30, and/or the end pieces 11, 12, for example, as disclosed in U.S. Provisional Application No. 61/476,874. Alternatively or additionally, the fluid treatment units 13 may be pressed against one another along with the manifold(s) 14 by the end pieces 11, 12 and the retainer 26.

Each end piece 11, 12 may be configured in a variety of ways. For example, an end piece may comprise a generally polygonal, e.g., hexagonal or rectangular, plate. For many embodiments, each end piece 11, 12 may be configured as a flat, rigid, generally rectangular plate having first and second opposite surfaces 35, 36. The surface 36 facing the fluid treatment unit(s) 13 or manifold(s) 14 may include a mounting region 37 which may have a shape and size similar to the fluid treatment unit 13 or manifold 14. For many embodiments, an adjacent fluid treatment unit or manifold may directly contact the mounting region or a gasket may be located between the mounting region and the fluid treatment unit or manifold. Further, the end piece may be a blind end piece that has no fluid passages and may close off fluid passages in the adjacent fluid treatment unit or manifold.

One, or for most embodiments both, end pieces 11, 12 may be formed from a high flexural modulus, low creep nonmetallic material. The nonmetallic material may also exhibit dimensional stability upon exposure to normal storage and operating temperatures and pressures and exposure to water or humidity. Further, the nonmetallic material may have a flexural modulus greater than about $8 \times 10^5$ psi. For example, the flexural modulus may be greater than about $1 \times 10^6$ psi, or greater than about $1.5 \times 10^6$ psi, or greater than about $2 \times 10^6$ psi. The nonmetallic material may comprise a composite of two or more nonmetallic materials, may include reinforcements such as imbedded fibers, e.g., carbon or glass fibers, or imbedded fibrous webs, e.g., woven or nonwoven webs such as glass webs, and may have a laminar structure. The nonmetallic material may be a polymeric material, including a thermoplastic or a thermoset, having the desired flexural modulus. Exemplary thermosets may include silicone, melamine, epoxy, and/or phenolic. For many embodiments, the nonmetallic material may comprise a phenolic laminate, including a G-series glass reinforced phenolic such as a G-10 phenolic material.

The size of each end piece 11, 12 may vary depending, for example, on the size of the fluid treatment unit(s) and/or the manifold(s) and the nominal operating pressure and temperature of the fluids within the fluid treatment assembly. Each end piece may have a thickness sufficient to resist undue flexing at the desired operating pressure and temperature. For many embodiments, the thickness may be up to about 0.25 inch (6 mm) or more, or up to about 0.50 inch (12 mm), or more or up to about 1.0 inch (25 mm) or more. The length and width of each end piece 11, 12 may be larger than the length and width of an adjacent fluid treatment unit 13 or manifold 14, and throughholes 38 or cutouts may be provided in each end piece 11, 12, for example, near or at the edge of each end piece 11, 12, to accommodate the retainer 26.

The retainer 26 may be configured in any of numerous ways to press the fluid treatment units 13, manifold(s) 14, and end pieces 11, 12 against one another and hold the fluid treatment assembly 10 together. For some embodiments, the retainer 26 may comprise a plurality of compression rod assemblies 40 that extend between the end pieces 11, 12 along or through the fluid treatment units 13 and the manifold(s) 14. Each compression rod assembly 40 may comprise an elongated compression rod 41 and a fastener 42 mountable to the compression rod 41 to tension the compression rod 41 between the end pieces 11, 12. For example, the compression rod 41 may have an enlarged head on one end and a threaded region at the other end, and the fastener 42 may comprise a nut threadable to the threaded end of the compression rod 41. Alternatively, nonthreaded compression rods and fasteners may be utilized, as disclosed, for example, in U.S. Patent Application Publication No. US 2008/0135499 A1 entitled Filtration Assemblies and Methods of Maintaining Compression of Filtration Units in Filtration Assemblies. The retainer, for example, the compression rod assembly including the compression rod and the fastener, may be formed from a metallic material, such as stainless steel. For other embodiments, the retainer may be formed from a high tensile strength, low creep, nonmetallic material. For example, the compression rod assembly including the compression rod and the fastener, may be formed from a polymeric material, such as a thermoplastic, a thermoset, or a polymeric composite, having sufficient tensile strength to hold the end pieces, fluid treatment units, and manifold(s) together. For many embodiments, the nonmetallic compression rod assemblies may be arranged to withstand a tensile load of up to about 800 pounds or more, or about 2,500 pounds or more, or about 5,000 pounds or more, or about 15,000 pounds or more and may be machined or molded from a polymeric material, including a thermoplastic or a thermoset such as those disclosed for the nonmetallic material of the end pieces.

The fluid treatment assembly may include one or more additional components. For example, seals, including, for example, gaskets, may be arranged between adjacent fluid treatment units, manifolds and/or end pieces to seal these components to one another. The fluid treatment assembly may further include one or more alignment rods for maintaining the fluid treatment units, the manifold, and/or the end pieces properly aligned with their fluid passages and openings appropriately communicating with one another. Examples of alignment rods are disclosed, for example, in United States Patent Application Publication No. US 2008/0135468 A1 entitled Filtration Assemblies and Methods of Installing Filtration Units in Filtration Assemblies.

To assemble the fluid treatment assembly 10, the fluid treatment unit(s) 13 and manifold(s) 14 along with any gaskets or other seals may be stacked between the mounting regions 40 of the end pieces 11, 12 with the appropriate fluid passages in the fluid treatment unit(s) 13 and manifold(s) 14 aligned and fluidly communicating with one another. The fluid treatment unit(s) 13, manifold(s) 14, and end pieces 11, 12 may or may not be directly or indirectly bonded to one another. The retainer 26 may then be mounted to the end pieces 11, 12. For example, a compression rod 42 may be axially inserted through a throughhole in one of the end pieces 11, 12; axially moved along the periphery of, or through a throughhole or cutout in, each fluid treatment unit 13 and manifold 14; and then axially inserted through the corresponding throughhole 35 in the opposite end piece 11, 12. The fastener 42 may then be fitted to the compression rod 41, tensioning the compression rod 41 and pressing and sealing the fluid treatment unit(s), manifold(s), and end pieces against one another. For example, the head of the compression rod 41 may press against the outer surface 35 of one end piece 11, 12, i.e., the surface opposite the mounting region 40 of the end piece 11, 12, and the nut may be tightened onto the threaded portion of the compression rod 41 against the outer surface 35 of the other end piece 11, 12, compressing the stack of end pieces 11, 12, fluid treatment unit(s) 13, and manifold(s) 14 along with any gaskets. The fastener 42 may be fitted to the compression rod 42 sufficiently tightly to energize any gaskets or other seals and securely hold the fluid treatment assembly 10 together without unduly flexing or bending the nonmetallic end pieces 11, 12 and weakening the seal between either nonmetallic end piece 11, 12 and an adjacent fluid treatment unit 13 or manifold 14. To reduce the bending forces acting at or near the edge of each nonmetallic end piece 11, 12, the throughholes 38 or cutouts in the end pieces 11, 12 may be located in a manner which positions the compression rod 41 within or in close proximity to the outer periphery of the adjacent fluid treatment unit 13 or manifold 14. For example, the distance between the outer periphery of the adjacent fluid treatment unit 13 or manifold 14 and the outer periphery of the control rod 41 may be about 1 inch (25 mm) or less, or about 0.5 inch (12 mm) or less, or about 0.25 inch (6 mm) or less, or about 0.125 inch (3 mm) or less.

Once assembled, the fluid treatment assembly 10 may be coupled to a fluid system by simply making the appropriate fluid connections that allow the fluid system to supply feed fluid to the feed inlet 20, receive permeate from the permeate outlet 22, and receive retentate from any retentate outlet 24 of the fluid treatment assembly 10. The feed fluid may enter the feed inlet 20 on the manifold 14 under pressure and pass through the feed passage 21 to the feed side 16 of the permeable fluid treatment medium 15 of one or more, e.g., all, of the fluid treatment units 13. The feed pressure may vary from one fluid system and fluid treatment assembly to another. For some embodiments, the feed pressure may be in the range from about 20 psi or less to about 80 psi or more, e.g., between about 40 psi and about 70 psi. The feed fluid may pass from the feed inlet 20 through the manifold 14 along the feed passage 21 through the feed opening 32 in each mounting surface 31 on the manifold 14 and into the fluid treatment unit(s) 13. The feed fluid may continue through the feed passage 21 in the fluid treatment unit(s) 13 and tangentially along the feed side 16 of each permeable medium 15. In embodiments arranged for a direct or dead-end flow mode of operation, the feed passage may terminate at the feed side of the permeable medium and all of the feed fluid may pass through the permeable medium to the permeate side as permeate. In embodiments arranged for a tangential or cross flow mode of operation, a portion of the feed fluid on the feed side 16 of the permeable medium 15 may pass through the permeable medium 15 to the permeate side 17 as permeate. The permeate passes under pressure from the permeate side 17 of the permeable medium 15 of one or more, e.g., all, of the fluid treatment units 13 through the permeate passage 23 to the permeate outlet 22. For example, the permeate may pass through the permeate passage 23 in each fluid treatment unit 13 to the permeate openings 33 in each mounting surface 31 of the manifold 14 and through the permeate passage 23 in the manifold 14 to the permeate outlet 22, where the permeate is received by the fluid system. The remainder of the fluid that does not pass from the feed side 16 through the permeable medium 15 passes under pressure as retentate from the feed side 16 of the permeable medium 17 of one or more, e.g., all, of the fluid treatment units 13 through the retentate passage 25 to the retentate outlet 24. For example, the retentate may pass through the retentate passage 25 in each fluid treatment unit 13 to the retentate openings 34 in a mounting surface 31 of the manifold and through the retentate passage 25 in the manifold 14 to the retentate outlet 24, where the retentate is received by the fluid system.

The invention offers many advantages and embodiments of the invention provide superior performance. For example, by providing one or more end pieces formed from a nonmetallic material having a flexural modulus no less than about $8 \times 10^5$ psi, fluid treatment assemblies embodying the invention easily withstand all of the forces generated by the pressurized fluids within the assembly without any external support. The nonmetallic end pieces coupled by the retainer form a secure pressure vessel, tightly sealing the fluid treatment unit(s), manifold(s), and any gaskets or other seals to one another and the end pieces without any external holders, such as mechanical or hydraulic presses. Because the nonmetallic end pieces have a flexural modulus of at least about $8 \times 10^5$ psi, there is no undue flexing or bending of the end pieces that would weaken the seals between the components of the fluid treatment assembly. Consequently, fluid treatment assemblies embodying the invention may be self-contained and may be preassembled, sealed, flushed, and/or sanitized by the manufacturer and then quickly and easily incorporated in the customer's fluid system by simply making the appropriate fluid connections and immediately processing the feed fluid.

While various aspects of the invention have been described and/or illustrated with respect to several embodiments, the invention is not limited to these embodiments. For instance, one or more features of an embodiment may be eliminated or modified or one or more features of one embodiment may be combined with one or more features of another embodiment without departing from the scope of the invention. Even embodiments with very different features may be within the scope of the invention. For example, one or both of the nonmetallic end pieces may be configured as a manifold including one or more of the feed inlet and feed passage, the permeate outlet and permeate passage, and the retentate outlet and retentate passage. The end piece manifold may direct feed fluid from the feed inlet through the feed passage to the fluid treatment units, direct permeate from the fluid treatment units to the permeate outlet, and/or direct retentate from the fluid treatment units to the retentate outlet. In addition, the nonmetallic end piece manifold may have a flexural modulus of at least $8\times10^5$ psi. Together with the opposite nonmetallic end piece and the retainer, the end piece manifold may securely seal and hold the fluid treatment assembly together without any external holders or other external supports.

Another embodiment of the invention may comprise a nonmetallic fluid treatment assembly which has no metal components. For example, the fluid treatment assembly may include nonmetallic end pieces, a nonmetallic retainer, one or more nonmetallic fluid treatment units, one or more nonmetallic manifolds, and nonmetallic gaskets or other seals, as previously described. Like other embodiments of the invention, a nonmetallic fluid treatment assembly may function without an external support, such as external holder. Further, a nonmetallic fluid treatment assembly is very environmentally friendly. For example, it can be easily recycled.

Further modifications and variations may become apparent to those of ordinary skill in the art upon reviewing the foregoing description and the attached drawings. Accordingly, the invention includes all variations, modifications, and equivalents of the subject matter recited in the following claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A fluid treatment assembly comprising:
    at least one fluid treatment unit including a permeable fluid treatment medium having a feed side and a permeate side;
    a feed inlet and a feed passage extending from the feed inlet to the feed side of the permeable fluid treatment medium;
    a permeate outlet and a permeate passage extending from the permeate side of the permeable fluid treatment medium to the permeate outlet;
    first and second end pieces, each of the first and second end pieces closes off fluid passages of an adjacent fluid treatment unit, wherein each of the at least one fluid treatment unit is positioned between the first and second end pieces and wherein each of the first and second end pieces is formed from a nonmetallic material and has a flexural modulus of at least about $1.5\times10^6$ psi; and
    a retainer extending between the first and second end pieces and arranged to press the at least one fluid treatment unit and the first and second end pieces against one another, wherein the retainer extends between the first and second end pieces along the at least one fluid treatment unit and a distance between an outer periphery of the retainer and an outer periphery of the at least one fluid treatment unit is less than or equal to about 0.25 inch (six millimeters).

2. The fluid treatment assembly of claim 1 further comprising a manifold positioned between the first and second end pieces, wherein the manifold includes the feed inlet and the feed passage or includes the permeate outlet and the permeate passage.

3. The fluid treatment assembly of claim 1 further comprising a retentate outlet and a retentate passage extending from the feed side of the permeable fluid treatment medium through the fluid treatment unit to the retentate outlet.

4. The fluid treatment assembly of claim 3 further comprising a manifold positioned between the first and second end pieces, wherein the manifold includes the feed inlet and the feed passage, includes the permeate outlet and the permeate passage, or includes the retentate outlet and the retentate passage.

5. The fluid treatment assembly of claim 4 wherein the distance between the outer periphery of the retainer and the outer periphery of said at least one fluid treatment unit is less than or equal to about 0.125 inch (three millimeters).

6. The fluid treatment assembly of claim 1 wherein the retainer comprises a compression rod assembly including a compression rod extending between the first and second end pieces and a fastener attached to the compression rod.

7. The fluid treatment assembly of claim 1 wherein the retainer is formed from a nonmetallic material.

8. The fluid treatment assembly of claim 1 wherein each of the first and second end pieces includes a thermoset as a nonmetallic material.

9. The fluid treatment assembly of claim 1 wherein at least one of the first and second end pieces comprises an end plate having no fluid passages.

10. The fluid treatment assembly of claim 1 wherein each of the first and second end pieces has a thickness of at least about one-quarter inch (six millimeters).

11. The fluid treatment assembly of claim 1 having no metal components.

12. A fluid treatment assembly comprising:
    first and second opposite end pieces, each of the first and second opposite end pieces being formed from a nonmetallic material and having a flexural modulus of at least about $1.5\times10^6$ psi;
    one or more manifolds positioned between the first and second opposite end pieces, wherein each of the one or more manifolds has at least one of a feed inlet, a permeate outlet, and a retentate outlet;

one or more fluid treatment units positioned between the first and second opposite end pieces, each of the first and second opposite end pieces closes off fluid passages of an adjacent fluid treatment unit, wherein each of the one or more fluid treatment units includes a permeable fluid treatment medium having a feed side and a permeate side;

a feed passage extending from the feed inlet through at least one of the one or more manifolds and at least one of the one or more fluid treatment units to the feed side of a permeable fluid treatment medium;

a permeate passage extending from the permeate side of each of the permeable fluid treatment mediums through at least one of the one or more fluid treatment units and to the permeate outlet;

a retentate passage extending from the feed side of the permeable fluid treatment medium through at least one of the one or more fluid treatment units and to the retentate outlet; and a retainer extending between the first and second opposite end pieces and arranged to press the one or more manifolds, the one or more fluid treatment units, and the first and second opposite end pieces against one another, wherein the retainer extends between the first and second opposite end pieces along the one or more fluid treatment units and a distance between an outer periphery of the retainer and an outer periphery of the one or more fluid treatment units is less than or equal to about 0.25 inch (six millimeters).

13. The fluid treatment assembly of claim 12 wherein two or more of the feed inlet, the permeate outlet, and the retentate outlet are positioned on the same manifold.

14. The fluid treatment assembly of claim 12 wherein the distance between the outer periphery of the retainer and the outer periphery of said one or more fluid treatment units is less than or equal to about 0.125 inch (three millimeters).

15. The fluid treatment assembly of claim 12 wherein the retainer comprises a compression rod assembly including a compression rod extending between the first and second opposite end pieces and a fastener attached to the compression rod.

16. The fluid treatment assembly of claim 12 wherein the retainer is formed from a nonmetallic material.

17. The fluid treatment assembly of claim 12 wherein each of the first and second opposite end pieces includes a thermoset as a nonmetallic material.

18. The fluid treatment assembly of claim 12 wherein each of the first and second opposite end pieces comprises an end plate having no fluid passages.

19. The fluid treatment assembly of claim 12 wherein each of the first and second opposite end pieces has a thickness of at least about one-quarter inch (six millimeters).

20. The fluid treatment assembly of claim 12 having no metal components.

* * * * *